United States Patent
Casler

[11] 3,893,424
[45] July 8, 1975

[54] ANIMAL COMB
[76] Inventor: Mary C. Casler, Washington, Conn. 06793
[22] Filed: Apr. 26, 1974
[21] Appl. No.: 464,366

[52] U.S. Cl. .................. 119/83; 119/93; 132/138
[51] Int. Cl. ............................................ A01k 13/00
[58] Field of Search .............. 119/83, 85, 89, 93; 132/136, 137, 138

[56] References Cited
UNITED STATES PATENTS
2,883,994  4/1959  Angelini et al. .................. 132/138
FOREIGN PATENTS OR APPLICATIONS
1,000,173  2/1952  France ............................. 132/136

*Primary Examiner*—Hugh R. Chamblee
*Attorney, Agent, or Firm*—Scrivener Parker Scrivener & Clarke

[57] ABSTRACT

A comb for removing loose hairs from the coat of a dog, cat or other animal wherein a plurality of spaced-apart substantially aligned teeth are secured to a base, at least some of the teeth being angularly directed to cross and contact on adjacent tooth to provide pairs of teeth in contact with each other; thus securing a "lead in" for the animal's hairs and to exert sufficient force against each other to grip and remove dead hairs as the comb is drawn through the coat of the animal, but not to exert enough force to pull on live hairs to the extent of discomforting the animal.

2 Claims, 7 Drawing Figures

3,893,424
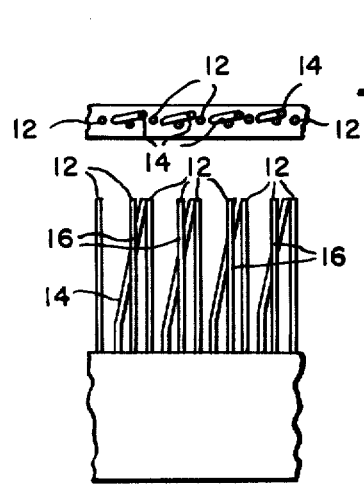
Fig.2
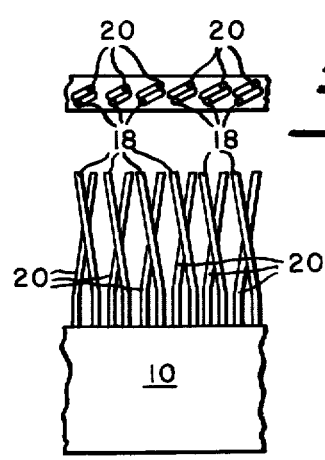
Fig.4
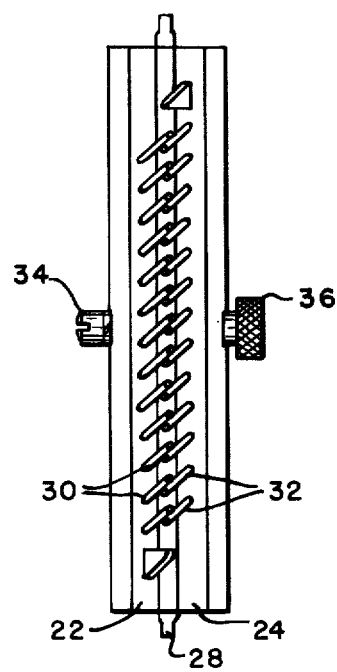
Fig.1
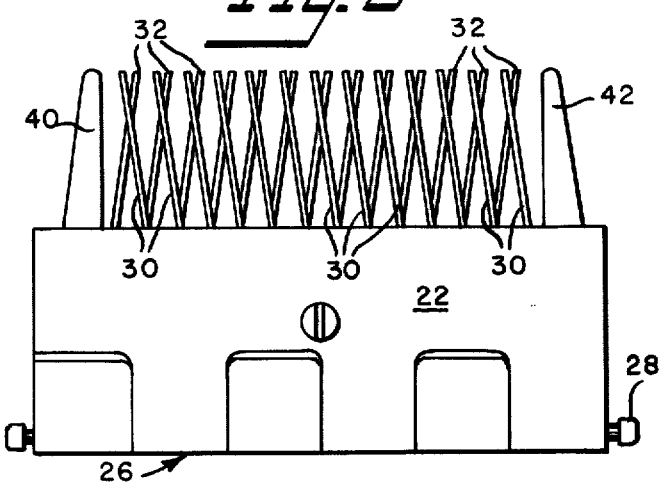
Fig.3
Fig.5
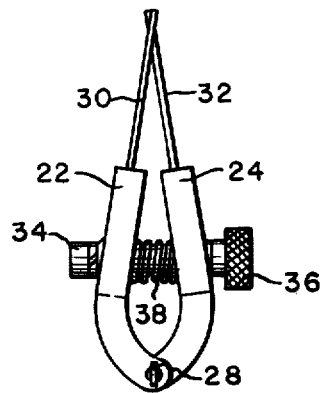
Fig.7

ANIMAL COMB

DESCRIPTION OF THE INVENTION

This invention relates to a comb for removing loose hairs from the coats of animals, such as dogs for example, without unduly pulling on the live hairs, and is especially well adapted for use on dogs having heavy coats of long hair, such as the collie for example.

The principal object of the invention is to provide a comb of the above character which is provided with a plurality of spaced apart teeth wherein the teeth of a plurality of pairs contact each other with a predetermined force so that as the comb is passed through the dog's coat, the pairs of teeth will grip and remove the loose hairs but the live hairs will not be gripped with sufficient force to discomfort the dog.

A further object is to provide a novel grooming comb wherein the contacting force may be manually varied at will so that the gripping force on the loose hair may be readily changed. Such a comb may thus be adjusted for different dogs or for different areas of the same dog.

In the drawing wherein similar reference characters refer to similar parts throughout the several views:

FIG. 1 is a side view of the comb having teeth constructed and arranged in accordance with the present invention;

FIG. 2 is a top view of the comb of FIG. 1;

FIG. 3 is a side view of a modified form of comb;

FIG. 4 is a top view of the comb of FIG. 3;

FIG. 5 is a side view of a further modification of the invention wherein the contacting force between adjacent teeth may be manually adjusted;

FIG. 6 is a top view of the comb of FIG. 5, and

FIG. 7 is an end view of the comb of FIG. 5.

Referring more particularly to FIGS. 1 and 2 the novel comb of the present invention is illustrated therein as comprising a base or back 10 having a plurality of spaced apart upstanding straight teeth 12 and a plurality of teeth 14 which are bent as illustrated. As shown, every third tooth is bent and the upper portions of such bent teeth 14 contact the adjacent straight teeth 12 at areas shown at 16 with a predetermined force such that when the comb is in use, the loose hairs will be gripped between teeth 12 and 14 at areas 16 and removed from the dog's coat. Such force however, is chosen so that the live hairs will not be gripped with sufficient force to be uncomfortable to the dog.

A further form of the invention is shown in FIGS. 3 and 4 wherein teeth 18 and 20 of adjacent pairs of teeth are bent to cross each other and to contact each other with the predetermined force required to remove the loose hairs. As in the case of FIG. 1, the teeth are in substantial alignment, are preferably round or cylindrical and are mounted in the back or base 10.

It will be appreciated from the foregoing that the gripping force between the teeth of the combs of FIGS. 1 and 3 is a fixed force which is predetermined by the manner in which the teeth are bent into engagement with each other. FIGS. 5, 6 and 7 show a further modification of the invention wherein the force with which the crossing teeth contact each other may be manually adjusted. Such a comb may be readily adjusted for different dogs or for stripping operations on different paths of the same dog.

Referring now to FIGS. 5-7, the novel comb of the invention comprises identical halves including base members 22 and 24 which are hinged together by a piano type hinge 26 which includes a hinge pin 28. As shown, teeth 30 carried by the base member 22 are aligned and parallel and are slightly inclined toward the left as viewed in FIG. 5 while the teeth 32 carried by the base member 24 are aligned and parallel and are slightly inclined toward the right as viewed in FIG. 5. Because of this arrangement, adjacent teeth cross each other and the contacting force between the pairs of teeth may be readily adjusted by means of a bolt 34 and nut 36, tightening of the latter moving the base members 22 and 24 about the hinge pin 28 and against the tension of spring 38 in order to increase the contact force between the teeth 30, 32 of the adjacent pairs of contacting teeth. In this manner the gripping force for the loose hair may be readily adjusted, thus adapting the comb of FIG. 5 for use with dogs having widely different coats. As shown, the teeth of the comb of FIG. 5 are straight and the comb preferably includes guard teeth 40 and 42.

From the foregoing, it will be readily appreciated that the invention provides a novel comb construction for efficiently removing the loose hair from a dog's coat without gripping the live hairs with sufficient force as to exert any pull which might be uncomfortable to the dog. The form of the invention shown in FIGS. 5-7 enables the contacting force between the teeth to be easily adjusted. In operating this modification, the teeth are always in contact and the relative movement of the two halves of the comb is only the slight amount resulting from the resilience of the contacting teeth as the force between them is increased or decreased. Adjustment is made only when necessary to provide the proper pull for the hair being removed.

It will be apparent to those skilled in the art that the invention is susceptible of a variety of modifications without departing from the scope of the invention as determined by the appended claims.

What is claimed is:

1. A comb for stripping loose hairs from the coat of an animal comprising a base having a pair of members hingedly connected together and each of said members being provided with spaced apart, straight and upstanding teeth, all of said teeth of one member being parallel and angularly directed in one direction and all of the teeth of the other member being parallel and angularly directed in the opposite direction, means for interconnecting said members to provide a plurality of adjacent pairs of teeth, the teeth of each pair crossing and contacting each other with a predetermined force, and means for adjusting one member relative to the other member to vary the predetermined force between said contacting teeth.

2. A comb as set forth in claim 1 wherein the interconnecting means includes a bolt and nut construction and resilient means normally tending to urge said members apart, relative movement between said bolt and nut urging said members together against the action of said resilient means to vary the contacting force between said crossed teeth.

* * * * *